(12) United States Patent
Choi et al.

(10) Patent No.: US 6,560,679 B2
(45) Date of Patent: May 6, 2003

(54) METHOD AND APPARATUS FOR REDUCING POWER CONSUMPTION BY SKIPPING SECOND ACCESSES TO PREVIOUSLY ACCESSED CACHE LINES

(75) Inventors: Hoon Choi, Seoul (KR); Myung-Kyoon Yim, Kyunggi-do (KR)

(73) Assignee: Samsung Electronics Co., Ltd. (KR)

( * ) Notice: Subject to any disclaimer, the term of this patent is extended or adjusted under 35 U.S.C. 154(b) by 178 days.

(21) Appl. No.: 09/742,030

(22) Filed: Dec. 20, 2000

(65) Prior Publication Data

US 2001/0049772 A1 Dec. 6, 2001

(30) Foreign Application Priority Data

Jun. 5, 2000 (KR) ........................................ 2000-30879

(51) Int. Cl.⁷ .............................................. G06F 12/08
(52) U.S. Cl. ...................... 711/138; 711/137; 711/144; 711/128
(58) Field of Search .............................. 711/3, 137, 144, 711/128, 138

(56) References Cited

U.S. PATENT DOCUMENTS 5,528,592 A * 6/1996 Schibler et al. ............. 370/397
5,537,570 A * 7/1996 Tran ............................ 711/118
5,542,062 A * 7/1996 Taylor et al. ................ 711/118
5,586,283 A * 12/1996 Lopez-Aguado et al. ... 711/206
5,724,548 A * 3/1998 Takahashi et al. .......... 711/138
5,860,113 A * 1/1999 Tung ........................... 711/142
6,032,229 A * 2/2000 Hotta et al. .................. 711/122

FOREIGN PATENT DOCUMENTS

JP 11184752 A 9/1999 ........... G06F/12/08

* cited by examiner

Primary Examiner—Reginald G. Bragdon
Assistant Examiner—Midys Inoa
(74) Attorney, Agent, or Firm—Mills & Onello, LLP

(57) ABSTRACT

A digital data processing system is provided which includes a digital data processor, a cache memory having a tag RAM and a data RAM, and a controller for controlling accesses to the cache memory. The controller stores state information on access type, operation mode and cache hit/miss associated with the most recent access to the tag RAM, and controls a current access to the tag RAM just after the preceding access based on the state information and a portion of a set field of a main memory address for the second access. The controller determines whether the current access is applied to the same cache line that was accessed in the first access based on the state information and a portion of a set field of the main memory address for the second access, and allows the current access to be skipped when the current access is applied to the same cache line that was accessed in the preceding access.

11 Claims, 5 Drawing Sheets

Sequential Access States        Sequential Access Example

METHOD AND APPARATUS FOR REDUCING POWER CONSUMPTION BY SKIPPING SECOND ACCESSES TO PREVIOUSLY ACCESSED CACHE LINES

This application relies for priority upon Korean Patent Application No. 2000-30879, filed on Jun. 5, 2000, the contents of which are herein incorporated by reference in their entirety.

BACKGROUND OF THE INVENTION

1. Field of the Invention

The present invention relates to digital data processing systems such as computer systems. More particularly, the invention relates to cache memories in digital data processing systems and methods of operating the cache memories.

2. Description of the Related Art

A computer system generally comprises a central processing unit (CPU), a system bus, a memory subsystem, and other peripherals. The CPU executes instructions stored in the memory subsystem, and the bus serves as a communication pathway between the CPU and other devices in the computer system. The memory subsystem typically includes a slow and inexpensive primary, or "main", memory, such as Dynamic Random Access Memory (DRAM), and fast and expensive cache memories, such as Static Random Access Memories (SRAMs).

Cache subsystems of a computer system are the result of a discrepancy in speed capability and price between SRAMs and DRAMs. This discrepancy lead to a architectural split of main memory into a hierarchy in which a small, relatively-fast SRAM cache is inserted in the computer system between a CPU and a relatively-slow, larger capacity, but less expensive, DRAM main memory.

A cache memory holds instructions and data which have a high probability of being desired for imminent processing by the CPU. By retaining the most-frequently accessed instructions and data in the high speed cache memory, average memory-access time will approach the access time of the cache. Therefore, use of caches can significantly improve the performance of computer systems.

Active program instructions and data may be kept in a cache by utilizing a phenomenon known as "locality of reference". The locality of reference phenomenon recognizes that most computer program instruction processing proceeds in a sequential fashion with multiple loops, and with a CPU repeatedly referencing to a set of instructions in a particular localized area of a memory. Thus, loops and subroutines tend to localize the references to memory for fetching instructions. Similarly, memory references to data also tend to be localized, because table lookup routines or other iterative routines repeatedly refer to a relatively small portion of a memory.

In a computer system, a CPU examines a cache prior to a main memory when a memory access instruction is processed. If a desired word (data or program instruction) is found in the cache, the CPU reads the desired word from the cache. If the word is not found in the cache, main memory is accessed to read that word, and a block of words containing that word is transferred from the main memory to the cache by an appropriate replacement algorithm. If a cache has the word is wanted by CPU, it is called a "hit"; if not, it is called a "miss."

A line of a simple cache memory usually consists of an address and one or more data words corresponding to that address. A line is also a minimum unit of information that can be moved between a main memory and a cache memory.

Data from a location in a main memory is stored on one line in a cache. Locations of a cache need to be identified. This is done by taking a portion of a main memory address. Also, because there are fewer cache lines than main memory blocks, an algorithm is needed for determining which main memory blocks are read into cache lines.

Various techniques are known for mapping blocks of a main memory into a cache memory. Typical forms of mapping include direct mapping, fully associative mapping, and set associative mapping.

Direct mapping technique maps each block of a main memory into only one possible cache line. This technique is simple and inexpensive to implement, but its primary disadvantage is that there is a fixed location for any given block. Thus, if a program happens to reference repeatedly from two different blocks that map into the same line, then the blocks will be continuously swapped in the cache, and their hit ratio will be low.

Fully associative mapping overcomes the drawbacks of direct mapping by permitting each main memory block to be loaded into any line of a cache. With this technique, there is flexibility as to which block to replace when a new block is read into a cache. A principal disadvantage of this technique is the complex circuitry to examine tags of all cache lines in parallel.

Set associative mapping (usually referred to as "N-way set associative mapping") is a compromise that exhibits the strengths of both direct and fully associative approaches. In this technique, a cache is divided into plural sets, each of which consists of several lines. This technique maps a block of main memory into any of the lines of set and permits the storage of two or more data words in a cache memory at the same set address (i.e., in one line of cache). In this approach, cache control logic interprets a main memory address simply as is three fields: a set, a tag, and a word. With set associative mapping, tag in a main memory address is relatively small and is only compared with tags within a single set, unlike the fully associative mapping wherein tag in a main memory address is quite large and must be compared to the tag of every line in a cache.

Performance of cache memories is frequently measured in terms of a "hit ratio." When a CPU references a cache memory and finds a desired instruction or data word in the cache, the CPU produces a hit. If the word is not found in the cache, then the word is in a main memory and the cache access counts as a miss. The ratio of the number of hits divided by the total CPU references to memory (i.e. hits plus misses) is the hit ratio.

To maximize hit ratio, many computer system organizations and architectures allow system control over the use of caches. For example, a cache may be used to store instructions only, data only, or both instructions and data. The design and operation principles of cache memories are described in detail in several handbooks, for example, entitled "Advanced Microprocessors," by Daniel Tabak, McGraw-Hill Book Co., Second Edition (1995), Chap. 4, pp. 43–65; "Computer Organization And Architecture," by William Stalling, Prentice-Hall, Inc., Fifth Edition (1996), Chap. 4, pp. 117–151; and "High Performance Memories," by Betty Prince, John Wiley & Sons, Inc., (1996), Chap. 4, pp. 65–94, which are hereby incorporated herein by reference.

To identify whether a cache hit or a cache miss occurs, that is, to know if a desired word is found in a cache, it is always necessary to access tag stored in the cache. Due to the current trends toward increasing cache size for high performance requirements (it is known that hit ratio of a simple cache tends to go up as the size of cache goes up.), the number of repetitive tag accesses in memory reference cycles increases. This results in more power consumption in caches and so hampers applying such caches to low power applications.

SUMMARY OF THE INVENTION

An object of the present invention is accordingly to provide methods and apparatuses for reducing power consumption of and improving performance of cache integrated circuit memory devices.

To attain the object, the present invention recognizes that a cache hit always occurs when current access is applied to instructions and/or data on the same cache line that was accessed and hit in the most recent access, and that if a miss occurred during the preceding access, a hit/miss of current access to the same line depends on whether or not a "cache line fill" (in which a complete cache line is read from main memory into cache memories) for the same line has been performed.

According to an aspect of the present invention, a digital data processing system is provided which includes a digital data processor, a cache memory having a tag RAM and a data RAM, and a controller for controlling accesses to the cache memory. The controller stores state information on access type, operation mode and cache hit/miss associated with a first access to the tag RAM, and controls a second access to the tag RAM, just after the first access, based on the state information and a portion of a set field of a main memory address for the second access. In particular, the controller determines whether the second access is applied to the same cache line that was accessed in the first access, based on the state information and a portion of a set field of the main memory address for the second access, and allows the second access to be skipped when the second access is applied to the same cache line that was accessed in the first access.

The cache memory may comprise a level-one (L1) cache or a level-two (L2) cache. In certain embodiments, the controller may be integrated on the same chip as the processor, along with a L1 cache. In other implementations, the controller may be integrated on a stand-alone chip, a memory controller chip, or each cache memory chip.

According to a preferred aspect of the present invention, the controller determines whether the first and second accesses are performed in a sequential fashion using the portion of the set field of the main memory address for the second access. The portion of the set field includes a least significant bit of the set field.

According to another aspect of the present invention, a cache integrated circuit memory device coupled between a processor and a main memory in a digital data processing system is provided, which comprises a data RAM circuit, a tag RAM circuit, a skip flag generator, a first RAM access control logic, a hit discriminator, and a second RAM access control logic.

The data RAM circuit is responsive to a portion of a main memory address from the processor and temporally stores instructions and data processed by the processor. The tag RAM circuit stores tags for accesses to the data RAM circuit and generates a plurality of tag hit signals by comparing a tag field of the main memory address with the stored tags. The skip flag generator generates a skip flag signal in response to an access type signal and an address signal from the processor. The first RAM access control logic controls accesses to the tag RAM circuit in response to the skip flag signal. The hit discriminator generates a plurality of data hit signals in response to an operation mode signal from the processor, the skip flag signal and the tag hit signals. The second RAM access control logic controls accesses to the data RAM circuit in response to the data hit signals. The skip flag generator includes circuitry to determine whether a current access to the tag RAM circuit is applied to the same cache line that was accessed in a preceding access to the tag RAM circuit by checking the access type signal and the address signal from the processor, and activates the skip flag signal in the current access is applied to the same cache line that was accessed in the preceding access. In particular, the first RAM access control logic cuts off supply of a clock signal to the tag RAM circuit when the skip flag signal is activated so as to allow the current access to the tag RAM circuit to be skipped. On the other hand, The second RAM access control logic, while the skip flag signal is active, transfers a clock signal to the data RAM circuit so as to allow the data RAM circuit to be accessed.

According to another aspect of the present invention, a method for operating the cache memory is provided which comprises determining whether a current access to a tag RAM circuit is applied to the same cache line that was accessed in a preceding access, and allowing the current access to the tag RAM to be skipped when the current access is applied to the same cache line that was accessed in the preceding access.

In an embodiment, the determining step includes generating a sequential access signal and a first main memory address for a current access to the cache memory, the sequential access signal indicative of a sequential access from a preceding access to the current access, detecting activation of the sequential signal and determining whether a one-bit address signal in the current access is identical with that in the preceding access, and activating a skip flag signal when the sequential signal is activated and the one-bit address signal in the current access is identical with that in the preceding access. The allowing step includes cutting off supply of a clock signal to the tag RAM circuit when the skip flag signal is activated.

BRIEF DESCRIPTION OF THE DRAWINGS

A more complete appreciation of the present invention, and many of the attendant advantages thereof, will become readily apparent as the same becomes better understood by reference to the following detailed description when considered in conjunction with the accompanying drawings in which like reference symbols indicate the same or similar components, wherein.

DETAILED DESCRIPTION OF PREFERRED EMBODIMENTS

A method and apparatus for reducing power consumption in cache memories, such as SRAMs or high performance DRAMs, is described. In the following description, numerous specific details are set forth, such as types of cache memories and memory configurations, etc., in order to provide a thorough understanding of the present invention. It will be apparent, however, to one of ordinary skill in the art that the present invention may be practiced without these specific details.

Figure 1:
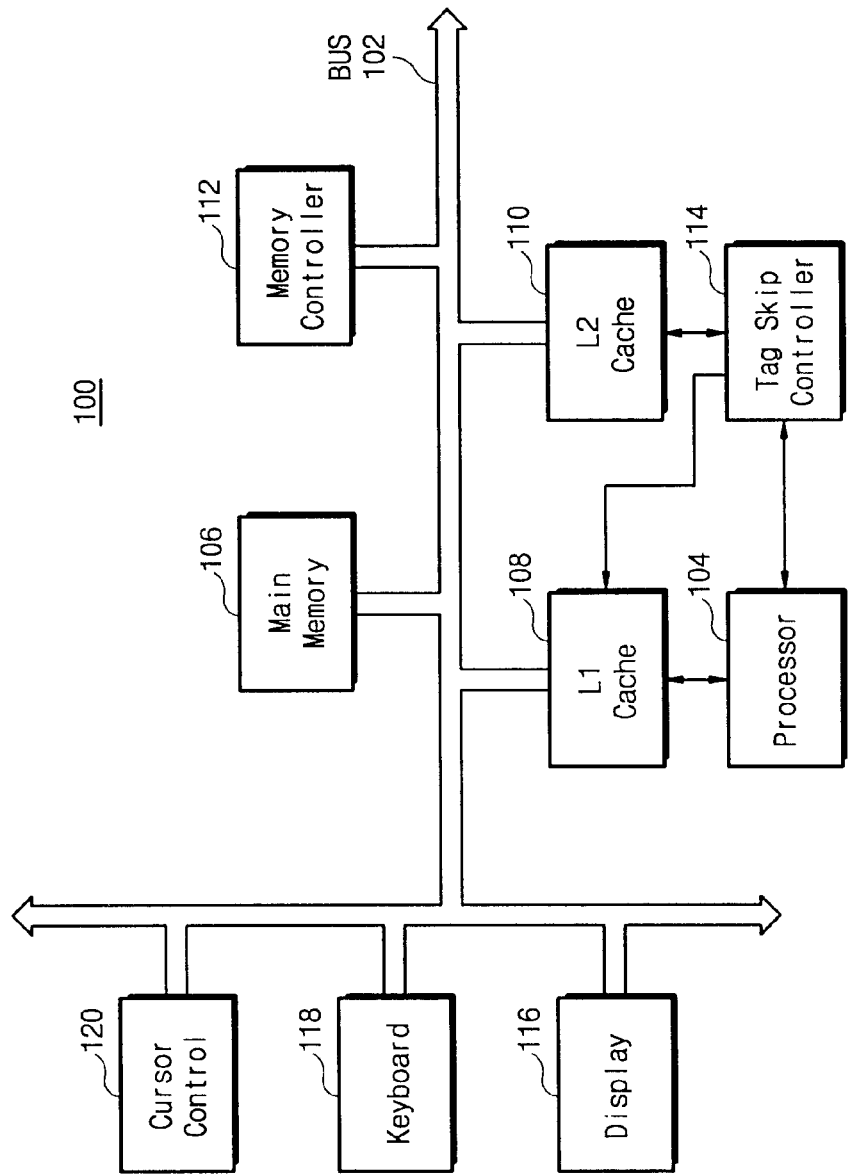
FIG. 1 is a block diagram of a computer system according to the present invention.

Referring first to FIG. 1, an overview of a computer system 100 of the present invention is shown in block diagram form. It will be understood that while FIG. 1 is useful for providing an overall description of the computer system 100, a number of details of the system 100 are not shown in order not to obscure the present invention.

As illustrated in FIG. 1, the computer system 100 comprises a system bus 102 for communicating information, a microprocessor or CPU (central processing unit) 104 coupled to the bus 102 for processing instructions, and a main memory 106 coupled to the bus 102 for storing instructions and data for the processor 104. An on-chip level-one (L1) cache memory 108, which is usually integrated on the same chip as the processor 104, is shown coupled to the bus 102 for temporarily storing frequently accessed instructions and data for the processor 104. Information is retrieved from main memory 106 for the processor 104 and stored in L1 cache memory 108. A level-two (L2) cache memory 110 is shown coupled to the bus 102. The L2 cache 110 also holds copies of instructions and data frequently requested by the processor 104 but the L2 cache 110 is typically integrated on an individual chip different from the processor chip 104. Memory controller 112 is also shown coupled to the bus 102 for controlling accesses to the main memory 106 and to the off-chip L2 cache 110.

Each of the L1 and L2 caches 108 and 110 may comprise a single cache to store both instructions and data. Alternatively, each of the caches 108 and 110 may be split into two sub-caches, one for instructions and the other for data.

Compared with off-chip L2 cache 110 reachable via the external bus 102, on-chip L1 cache 108 reduces the processor's external bus activity and therefore speeds up execution times and increases system performance. When a requested instruction or data item is found in L1 cache 108, there is no need to access the external bus 102, so that the bus 102 may support other transfers.

L2 cache 110 handles the more random memory requests, that L1 cache 108 tend to miss. In order to simplify the handling of requests that might miss L1 cache 108, the L2 cache 110 is almost always larger than L1 cache 108 to improve the chances of having the instructions or data in L2 cache 110.

When a cache miss occurs, a cache line fill operation, in which a complete cache line is read from main memory 106 into cache memories 108 and 110, is performed.

With continuing reference to FIG. 1, the computer system 100 also includes a tag skip controller 114 for controlling tag accesses of cache memories 108 and 110. By checking an access type (sequential access or non-sequential access) signal, an operation mode (read or write mode) signal and a part of main memory address, the tag skip controller 114 determines whether a current cache access is applied to the same cache line that was accessed in the most recent access and controls the tag accesses to L1 and L2 caches 108 and 110.

In certain implementations, the tag skip controller 114 may be integrated on the same chip as the processor 104, along with the L1 cache memory 108. In other implementations, the tag skip controller 114 may be integrated on an individual chip, such as a stand-alone chip, a memory controller chip, or each cache memory chip.

The computer system further comprises a display device 116 such as a cathode ray tube (CRT) or liquid crystal display (LCD) monitor, coupled to the bus 102 for displaying information to a computer user, an alphanumeric input device 118, such as a keyboard, including alphanumeric and other keys coupled to the bus 102 for communicating information and command selections to the processor 104, and a cursor control device 120, such as a trackball or stylus, coupled to the bus 102 for cursor movement.

Certain implementations and uses of the computer system 100 of the present invention may not require, nor include, all of the above components. For example, in certain implementations, the alphanumeric input device and the cursor control device may not be required, and in other implementations, it may not be required to provide a display device.

In order to reduce power consumption caused by frequent tag accesses to cache memories, the present invention utilizes the characteristics of cache memories that a cache hit or miss for plural instructions and data items on a cache line is determined by only one tag entry corresponding to the cache line. More specifically, the present invention recognizes that a cache hit always occurs when a current access is applied to instructions and/or data on the same cache line that was accessed and hit in the most recent access, and that if a miss occurred during the preceding access, then a hit or miss of current access to the same line depends on whether or not a cache line fill for the same line was performed in the preceding access. In the above cache accesses, it is possible to expect that a hit or miss will occur during a current access without performing tag access. Thus, if tag access are skipped in such cases, power consumption of cache memories will be reduced considerably.

Figure 2:
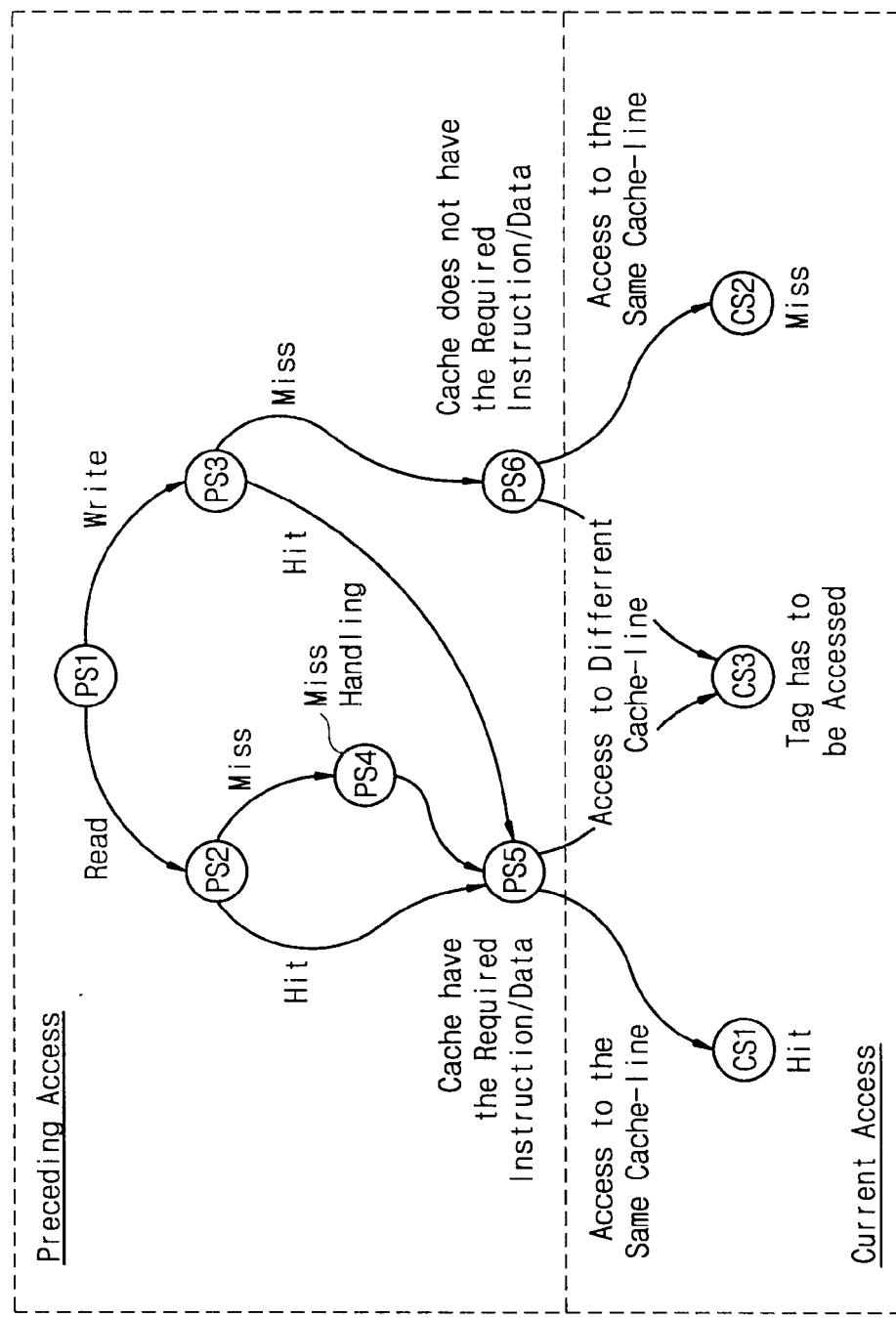
FIG. 2 is a state diagram for illustrating the cases of ability to skip tag access in a memory reference cycle.

FIG. 2 is a state diagram for explaining the instances of ability to skip the tag access to a cache in a memory reference cycle. In FIG. 2, reference symbols PS1–PS6 represent states in a first cache access cycle and symbols CS1–CS3 represent states for a second cache access cycle just following the first access cycle. However, it should be noted that all the states PS1–PS6 and CS1–CS3 are found in a single cache access cycle.

In the first access cycle (hereinafter, referred to as a preceding access), state PS1 represents an idle state wherein no memory reference cycle (i.e., read or write cycle) is performed. When a read or write cycle is driven by the processor 104, a state machine (not shown), contained in the memory controller 112, transitions from the idle state PS1 to either a read state PS2 or a write state PS3.

In state PS2 or PS3, when a cache hit occurs with respect to a read or write operation, the state machine transitions to state PS5 because a cache has a required instruction or data item. In state PS5, the cache access for read or write operation is completed. But, if a cache miss occurs in state PS2, then the state machine transitions state PS4, in which a read miss handling process is performed, and thereafter the state machine transitions to state PS5. Similarly, in state PS3, if a write miss occurs the state machine transitions to state PS6 which indicates that the cache dose not have a required instruction or data item. In state PS6, the cache access for write operation is completed.

In the second access cycle (hereinafter, referred to as a current access), if it is required to access the same cache line that has been accessed and hit in the preceding read or write access, the state machine transitions from state PS5 to state CS1. Also, if it is required to access the same cache line accessed and missed in the preceding write access, the state machine transitions from state PS6 to state CS2. In addition, when it is necessary to access another cache line different than the cache line accessed in the preceding read/write access, the state machine transitions from state PS5/PS6 to state CS3 where a tag storage of a cache memory must be accessed.

Considering the states in the preceding access, it can be appreciated that there are three cases where a tag access for current access is not necessary when current access is applied to the same cache line that was accessed in the preceding access. First, a read or write hit in the preceding access (PS5) means that a requested cache line for current access has already been stored in cache. In this case, current access to an instruction or data item on the corresponding line will always result in a hit (CS1), so that it is possible to skip tag access in current access. Second, a read miss in the preceding access (PS4) denotes that cache does not have the requested line. In this case, however, since a read miss handling for transferring the requested line from main memory to cache is performed, current access for the requested line will necessarily be a hit (CS1). Thus, tag access for current access can be skipped. Third, a write miss in the preceding access (PS6) denotes that cache does not have the requested line. In this case, current access for the requested line will always be missed (CS2) if cache does not support "load-on-write-miss" strategy. Thus, in this case, skipping the tag access is allowed.

Most of cache accesses are performed in a sequential fashion. Examples of sequential accesses include instruction fetches, cache line fills, array data fetches (e.g., matrix, vector, and numerical table fetches). Accordingly, attention is focused on the sequential accesses.

Many of recent microprocessors include a signal pin for indicating sequential accesses in memory reference cycles. For example, ARM processor cores, by Advanced RISC Machine, Ltd., provide an access type signal SEQ (ISEQ for an instruction cache or DSEQ for a data cache), which was originally intended to provide external memory block designers with timing margin as much as possible. Accordingly, when a cache is used with such processors, it is possible to know whether a current cache access is included in sequential accesses by monitoring the signal SEQ from the processors. Further, if a current access is a sequential one, it can be determined whether a current access is applied to the same cache line as the preceding access by checking only one bit of address for the current access. These will now be described by use of specific examples.

Figure 3:
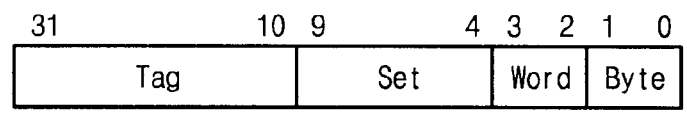
FIG. 3 illustrates an example of a format of a main memory address according to the present invention.

FIG. 3 illustrates a main memory address format according to the present invention. As is shown in FIG. 3, the address includes a byte field of two bits A0–A1, a word field of two bits A2–A3, a set field of six bits A4–A9, and a tag field of twenty-two bits A10–A31.

Byte field of A0–A1 designates positions of bytes in a word and denotes that a word consists of four bytes. Similarly, word field of A2–A3 designates positions of data words in a cache line, and denotes that a cache line consists of four data words.

Widths of the word field and the set field are changeable in accordance with the number of data words per a cache line. For example, if eight data words correspond to a cache line in the same address length, the word field and the set field will be three bits (e.g., A2–A4) and five bits (e.g., A5–A9), respectively.

Figure 4:
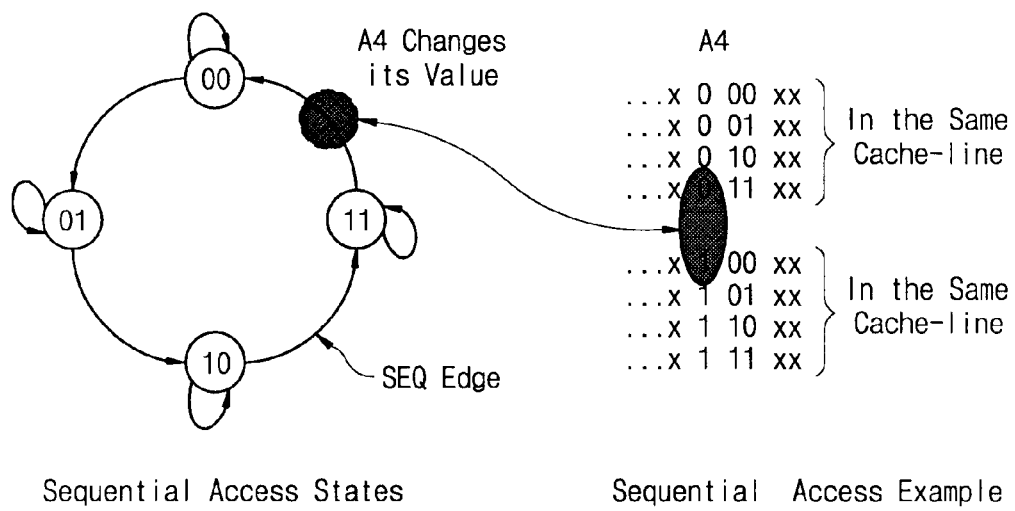
FIG. 4 illustrates an example of sequential accesses using multiple addresses having the address format of FIG. 3.

FIG. 4 illustrates an example of sequential accesses by multiple addresses with the format of FIG. 3. In case of sequential accesses, address bits A2–A3 will change their states in an order of, for example, 00, 01, 10, and 11, as illustrated in FIG. 4. Thus, a sequential shift from a cache line to another cache line can be recognized by monitoring the address bit A4. A change in A4 values during a current cache access means that a shift in cache lines takes place. If address bit A4 does not change in a current access, the current access will be applied to the same line as the preceding access.

Consequently, the tag skip controller 114 determines whether a current access is applied to the same cache line that was accessed in the preceding access by checking the access type signal SEQ and the least significant bit of set field (e.g., A4 for 4 words per cache line, or A5 for 8 words per cache line) from the processor 104.

Figure 5:
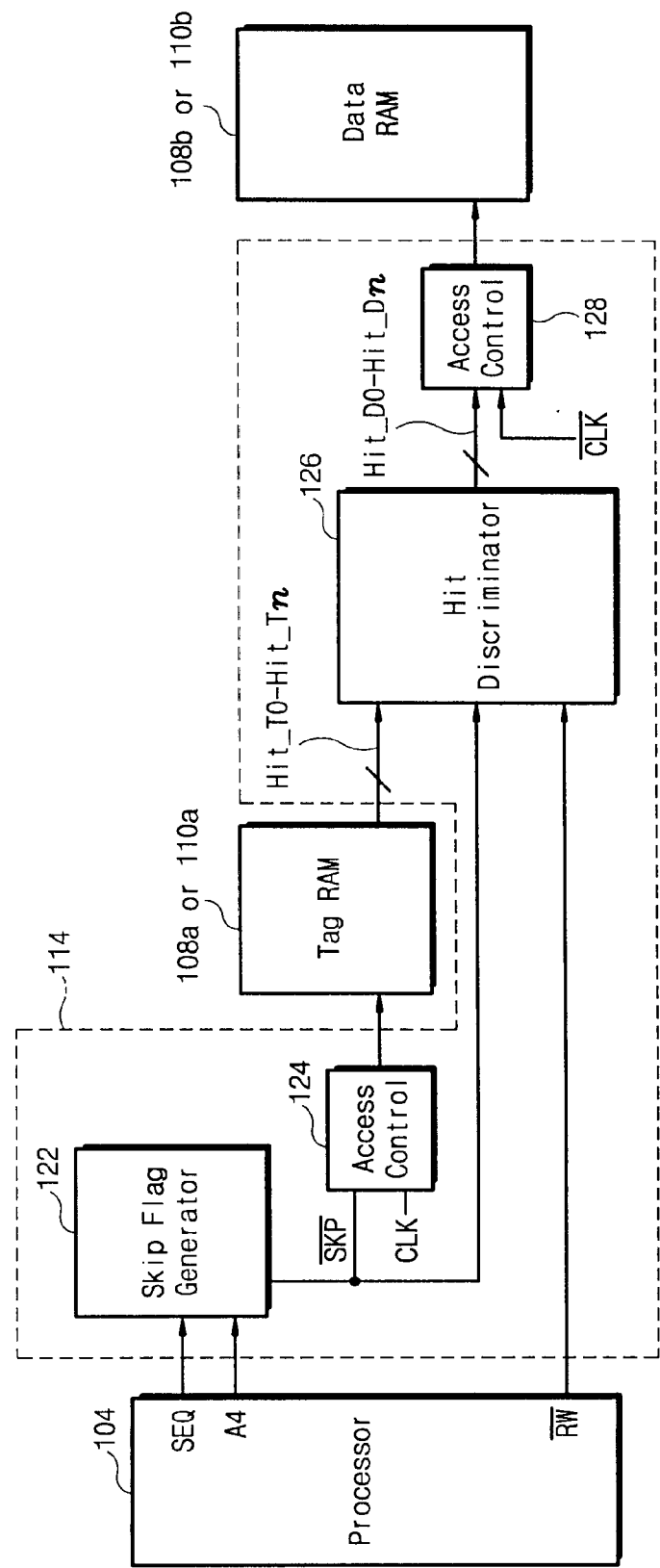
FIG. 5 is a detailed block diagram illustrating a preferred embodiment of the tag skip controller of FIG. 1 suitable for use in a system having the address format of FIG. 3.

FIG. 5 is a detailed block diagram illustrating an embodiment of the tag skip controller 114 suitable for use in a computer system having the address format of FIG. 3. Referring to FIG. 5, the tag skip controller 114 comprises a skip flag generator 122 coupled to processor 104, a tag RAM access control logic 124 coupled between the skip flag generator 122 and a tag RAM circuit 108a (for L1 cache 108) or 110a (for L2 cache 110), a hit discriminator 126 coupled to the processor 104, the tag RAM circuit 108a (or 110a) and the skip flag generator 122, and a data RAM access control logic 128 coupled between the hit discriminator 126 and a data RAM circuit 108b (for cache 108) or 110b (for cache 110). The tag skip controller 114 is supplied with a pair of complementary processor clock signals CLK and $\overline{CLK}$.

Data RAM 108b (or 110b) stores information desired by the processor 104, and tag RAM 108a (or 110a) is provided to store tag addresses for the data RAM circuit 108b (or 110b). If a tag produced by the processor 104 matches one of tags stored in the tag RAM 108a, then there is a hit.

Data RAM 108b may comprise a unified cache or a split cache. A unified cache stores both instructions and data. A split cache is divided into two sub-caches, one for instructions and one for data. The two types of caches may have different structures to optimize their function.

Skip flag generator 122 receives an access type signal SEQ and a one-bit address signal A4 from the processor 104, and generates a skip flag signal $\overline{SKP}$. The skip flag generator 122 determines whether or not a current cache access is applied to the same cache line that was accessed in the preceding access. If so, the skip flag generator 112 activates the skip flag signal $\overline{SKP}$ but, if not, deactivates the $\overline{SKP}$ signal. Address signal A4 is the least significant bit of set field of the main memory address only for use in a cache line structure with 4 data words per line. The address signal is substituted with another address signal, depending on cache line structure. For example, in a cache line structure containing 8 words per line, the processor 104 supplies address signal A5 to the skip flag generator 122.

Tag RAM access control logic 124 receives skip flag signal $\overline{SKP}$ and clock signal CLK. When the skip flag signal $\overline{SKP}$ is inactive (a logic "1" or high state), the control logic 124 transfers the clock signal CLK to tag RAM 108a, so that tag RAM 108a is accessed. If a tag match (i.e., a cache hit) occurs, one of tag hit signals Hit_T0–Hit_Tn becomes active. If a tag mismatch (i.e., a cache miss) occurs, all the tag hit signals Hit_T0–Hit_Tn are deactivated. When the signal $\overline{SKP}$ becomes active (a logic "0" or low state), the control logic 124 cuts off the supply of the clock signal CLK to the tag RAM 108a. This results in skipping an access to the tag RAM 108a so as to reduce power consumption of the cache memory.

Hit discriminator 126 is supplied with an operation mode signal (or a read/write signal) $\overline{RW}$ from processor 104, skip flag signal SKP from skip flag generator 124, and tag hit signals Hit_T0 through Hit_Tn from tag RAM 108a. The operation mode signal $\overline{RW}$ becomes active (a logic zero state) during a read cycle while it goes inactive (a logic one state) during a write cycle. Hit discriminator 126 generates data hit signals Hit_D0 through Hit_Dn to control accesses to the data RAM 108b in response to the tag hit signals Hit_T0–Hit_Tn, the skip flag signal $\overline{SKP}$, and the operation mode signal $\overline{RW}$. Specifically, when the skip flag signal $\overline{SKP}$ is active, the states (i.e., activation and deactivation) of the data hit signals Hit_D0–Hit_Dn are determined based on the final state and the access type (a sequential or non-sequential access) in the preceding access, but if the skip flag signal $\overline{SKP}$ becomes inactive then the states of the respective signals Hit_D0–Hit_Dn are determined by only the tag hit signals Hit_T0–Hit_Tn. The activation of Hit_D0–Hit_Dn signals is an indication of access to the data RAM 108b.

Meanwhile, if the cache system of the present invention has a "load-on-write-miss" scheme, the hit discriminator 126 is able to carry out the above functions independent of operation mode signal $\overline{RW}$. Specifically, hit discriminator 126 outputs the data hit signals Hit_D0–Hit_Dn of the preceding access as new data hit signals of the current access without access to the tag RAM when the skip flag signal $\overline{SKP}$, having information about the sequential access, is active (i.e., when the current access is applied to the same cache line that was access in the preceding access), but outputs the tag hit signals Hit_T0–Hit_Tn of the current access as new data hit signals of the current access when the skip flag signal $\overline{SKP}$ is inactive (i.e., when the current access is applied to a cache line different from one accessed in the preceding access).

Unless the cache system of the present invention is provided with a "load-on-write-miss" function, it will be necessary to inspect the operation mode signal $\overline{RW}$.

Data RAM access control logic 128 receives data hit signals Hit_D0–Hit_Dn and clock signal $\overline{CLK}$. When one of the data hit signals Hit_D0–Hit_Dn is active (a logic one state), the control logic 128 transfers the clock signal $\overline{CLK}$ to the data RAM 108b. This permits the data RAM 108b to be accessed. On the other hand, if the signals Hit_D0–Hit_Dn all become inactive (a logic zero state), that is, when a cache miss occurs, the control logic 128 cuts off the supply of the clock signal $\overline{CLK}$ to the data RAM 108b, so that accessing to the data RAM 108b is blocked.

Figure 6:
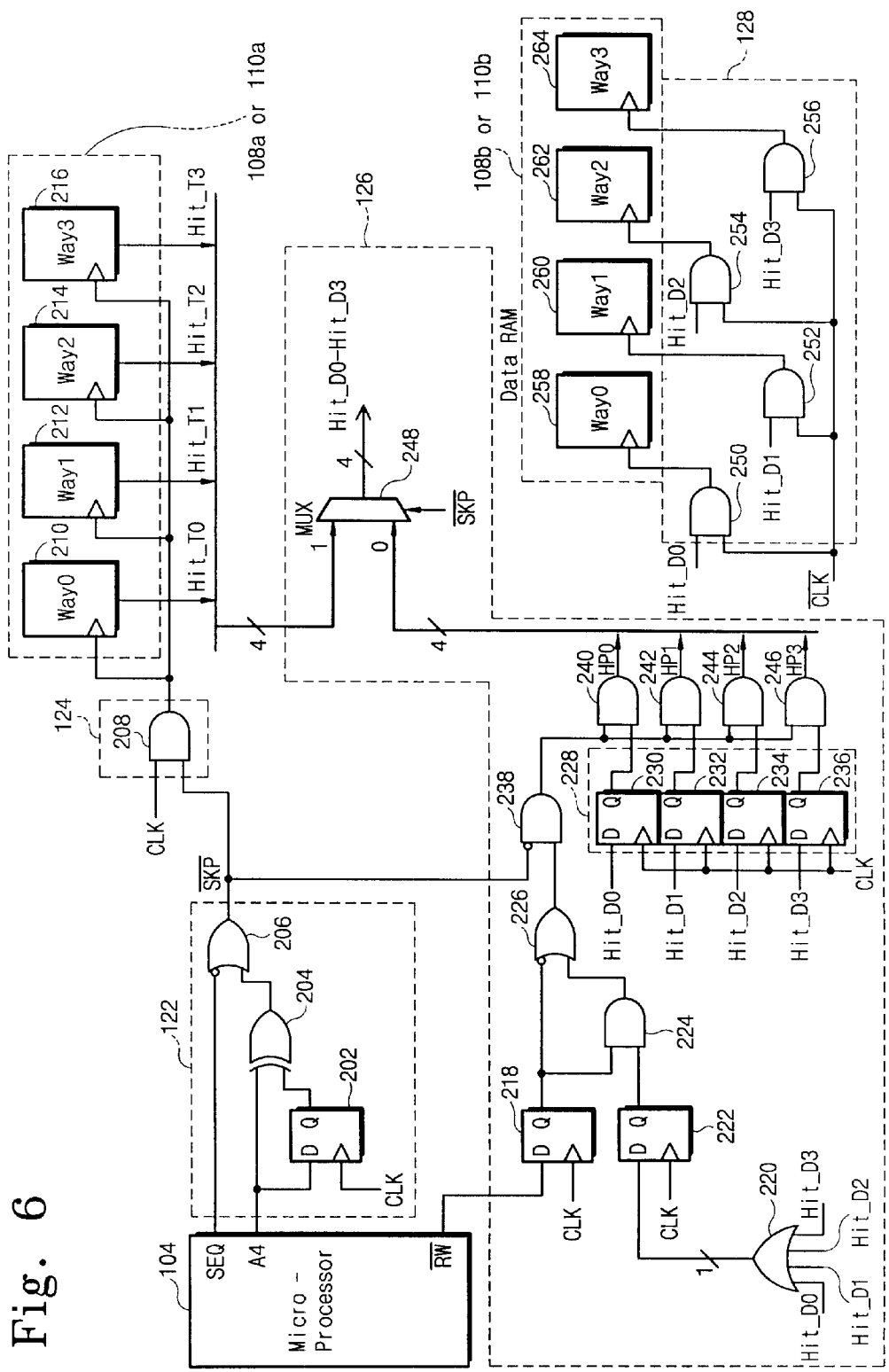
FIG. 6 is a detailed circuit diagram of the tag skip controller of FIG. 5.

FIG. 6 is a detailed circuit diagram of an embodiment of the tag skip controller 114 shown in FIG. 5. Referring to FIG. 6, skip flag generator 122 includes an edge-triggered D (data) flip-flop 202, an XOR (exclusive OR) logic gate 204, and an OR logic gate 206. Processor clock CLK is provided to a clock input of the D flip-flop 202 which has a data input D coupled to an address bit A4 of processor 104 and an output Q coupled to an input of the XOR logic gate 204. The address bit A4 is also applied to another input of the XOR logic gate 204. OR logic gate 206 includes an input for receiving an inverted signal of the access type signal SEQ from the processor 104 and another input coupled to an output of the XOR logic gate 204. The OR logic gate 206 provides the skip flag signal $\overline{SKP}$ through its output.

Tag access control logic 124 includes an AND logic gate 208 having an input for receiving the skip flag signal $\overline{SKP}$ and another input for receiving the clock signal CLK.

In this embodiment, a 4-way set associative cache organization is illustrated for simplicity. Tag RAM 108a (or 110a) has four ways Way0–Way3 or four banks 210–216 with clock inputs tied to an output of the AND logic gate 208. Data RAM 108b (or 110b) is also divided into four banks 258–264. The banks 210–216 and 258–264 can be accessed on a rising edge of input clock signal.

Although not shown in FIG. 6, each of the tag banks 210–216 is coupled to a 22-bit width bus (not shown) for transferring tag bits of a memory address generated by the processor 104, and each has a width of 22 bits. Similarly, each of the data banks 258–264 is coupled to a 32-bit width bus (not shown) for delivering instructions or data and has a width of 32×4 bits. In addition, each of tag banks 210–216 includes a comparator (not shown) that compares the tag bits of the new address with the tags stored in all the locations of the tag RAM 108a. The tag comparison for all the banks 210–216 is made simultaneously, and if the tag matches for one of the banks, then there is a cache hit.

In a sequential access, access type signal SEQ is driven to a logic one (or high) state by the processor 104 while it is driven to a logic zero (or low) state in a non-sequential or random access mode.

The D flip-flop 202 stores a value of address signal A4 in the preceding access. The XOR logic gate 204 determines whether the A4 value stored in the D flip-flop 202 is identical with an A4 value from the processor 104 in current access. If the A4 value of the preceding access differs from that of current access, the XOR logic gate 204 produces an output of a logic one state, which means that current access will be applied to a cache line certainly different from that in the preceding access. On the other hand, if the two A4 values are same then XOR logic gate 204 produces an output of a logic zero state, which means that there is a possibility that current access will be applied to the same line that was accessed in the preceding access.

OR logic gate 206 finally determines whether the current access will be applied to the same cache line as accessed in the preceding access. If so, OR logic gate 206 outputs a skip flag signal $\overline{SKP}$ of a logic zero state, but if not, outputs a skip flag signal $\overline{SKP}$ of a logic one state.

When the skip flag signal $\overline{SKP}$ is in logic one state, AND logic gate 208 within tag RAM access control logic 124 supplies the clock signal CLK to the tag banks 210–216. When the skip flag signal $\overline{SKP}$ is in logic zero state, AND logic gate 208 cuts off the supply of the clock signal CLK to the tag banks 210–216.

A 22-bit tag address A10–A31 generated by the processor 104 is provided to all of the tag banks 210–216, and compared with tags stored in all the locations of the tag banks 210–216. The tag comparison for all the banks 210–216 is made simultaneously. If a tag match (i.e., a cache hit) occurs, one among the tag hit signals Hit_T0–Hit_T3 becomes active (a logic one state).

Hit discriminator 126 includes edge-triggered D flip-flops 218 and 222, OR logic gates 220 and 226, a 4-bit register 228 implemented with four edge-triggered D flip-flops 230, 232, 234 and 236, AND logic gates 224, 238, 240, 242, 244 and 246, and a 2×1 multiplexer 248.

D flip-flop 218 is synchronized with clock signal CLK, and has an input D for receiving the operation mode signal $\overline{RW}$ from processor 104 and an output Q coupled to one input of AND logic gate 224. OR logic gate 220 includes four inputs for receiving the data hit signals Hit_D0–Hit_D3. D flip-flop 222 is also synchronized with clock signal CLK, and has an input D coupled to an output of the OR logic gate 220 and an output Q coupled to another input of AND logic gate 224. OR logic gate 226 has an input for receiving an inverted signal of the output Q of D flip-flop 218 and another input coupled to an output of the AND logic gate 224.

D flip-flops 230–236 are synchronized with clock signal CLK and has their inputs D for receiving the data hit signals Hit_D0–Hit_D3, respectively.

AND logic gate 238 has an input for receiving an inverted signal of the skip flag signal $\overline{SKP}$ and another input coupled to an output of OR logic gate 226. An output of the AND logic gate 238 is commonly provided to first inputs of AND logic gates 240–246. Outputs Q of the flip-flops 230–236 are coupled to second inputs of AND logic gates 240–246, respectively.

Multiplexer 248 has a first input for receiving the tag hit signals Hit_T0–Hit_T3 from tag RAM 108a, a second input for receiving hit prediction signals HP0, HP1, HP2 and HP3 from AND logic gates 240–246, and an output for providing data hit signals Hit_D0–Hit_D3.

D flip-flop 218 stores read/write information of the preceding access. When a read operation was performed in the preceding access, output Q of the D flip-flop 218 in the current access is in a logic zero state. On the contrary, if a write operation was performed in the preceding access then output Q of D flip-flop 218 in the current access remains in a logic one state.

OR logic gate 220 provides an output of a logic one state when a cache hit occurred in the preceding access, while the OR logic gate 220 provides an output of a logic zero state if a cache miss occurred in the preceding access. D flip-flop 222 stores cache hit/miss information from OR logic gate 220. If a cache hit occurred in the preceding access, output Q of the D flip-flop 222 remains in logic one state. On the other hand, if a cache miss occurred in the preceding access, output Q of D flip-flop 222 remains in logic zero state.

AND logic gate 224 provides an output of a logic one state when a write operation was performed and a cache hit occurred in the preceding access, otherwise the AND logic gate 224 provides an output of a logic zero state.

OR logic gate 226 produces an output of a logic one state either when a read operation was carried out in the preceding access or when a write operation was performed and a cache hit occurred in the preceding access. Namely, OR logic gate 226 outputs a signal of logic one when the preceding access was terminated at state PS5 shown in FIG. 2. In other cases, OR logic gate 226 produces an output signal of a logic zero state.

Register 228 stores the data hit signals Hit_D0–Hit_D3 from multiplexer 248 for use in the next access. In other words, register 228 has stored information as to which of the ways Way0–Way3 was hit in the preceding access.

AND logic gate 238 produces an output of a logic one state when both outputs of OR logic gates 206 and 226 remains in logic zero state and logic one state, respectively, which means that current access corresponds to state CS1 shown in FIG. 2 and is applied to the same cache line as accessed in the preceding access (i.e., a requested cache line for current access has already been stored in cache memory). AND logic gate 238 outputs a logic zero signal either when a cache miss occurred in the preceding write access (such as CS2 in FIG. 2 if the same cache line is accessed) or when current access is applied to a cache line different from the line accessed in the preceding read/write access (i.e., CS3 in FIG. 2).

AND logic gates 240–246 produces hit prediction signals HP0–HP3 by combining outputs Q of D flip-flops 230–236 with output of AND logic gate 238, respectively.

Multiplexer 248 is controlled by skip flag signal $\overline{SKP}$ from skip flag generator 122. When the skip flag signal $\overline{SKP}$ is in logic one state, the multiplexer 248 selects the tag hit signals Hit_T0–Hit_T3 from tag RAM 108a as the data hit signals Hit_D0–Hit_D3. When the skip flag signal $\overline{SKP}$ is in logic zero state, the multiplexer 248 selects the hit prediction signals HP0–HP3 from AND logic gates 240–246 as the data hit signals Hit_D0–Hit_D3.

Data RAM access control logic 128 includes AND logic gates 250, 252, 254, and 256. AND logic gates 250–256 has first inputs commonly supplied with clock signal $\overline{CLK}$ and second inputs for receiving data hit signals Hit_D0–Hit_D3, respectively. When one of the data hit signals Hit_D0–Hit_D3 is active (a logic one state), namely, when a cache hit occurs, one of AND logic gates 250–256 transfers the clock signal $\overline{CLK}$ to a corresponding one of data banks 258–264 so as to be accessed. When the signals Hit_D0–Hit_D3 all become inactive (a logic zero state), that is, when a cache miss occurs, AND logic gates 250–256 cut off the supply of the clock signal $\overline{CLK}$ to the data banks 256–264, so that access to all the banks 256–264 is intercepted.

As described above, the hit discriminator 126 can perform its functions independent of operation mode signal $\overline{RW}$ if the cache system of the present invention has a load-on-write-miss function so that all cache accesses to the cache system of the invention can always be hit. In this case, removal of OR logic gates 220 and 226, AND logic gate 224, and D flip-flops 218 and 222 from the circuit of FIG. 6 is permitted by substituting AND logic gate 238 with an inverter logic gate receiving the skip flag signal $\overline{SKP}$. In this case, hit discriminator 126 outputs the data hit signals Hit_D0–Hit_Dn of the preceding access as new data hit signals of the current access without access to the tag RAM when the skip flag signal $\overline{SKP}$, having information about the sequential access, is active (i.e., when the current access is applied to the same cache line that was access in the preceding access), but outputs the tag hit signals Hit_T0–Hit_Tn of the current access as new data hit signals of the current access when the skip flag signal $\overline{SKP}$ is inactive (i.e., when the current access is applied to a cache line different from one accessed in the preceding access).

While the invention has been described with reference to several embodiments, it will be understood that the embodiments are illustrative and that the scope of the invention is not limited to them. Many variations, modifications, additions and improvements of the embodiments described are possible. For example, although 4-way set associative cache memories are provided in the embodiment shown in FIG. 6, the cache memories each may have a fewer or larger way configuration. Further, any suitable caching strategy or policy may be tagged in this manner. Particularly, although the embodiments of the present invention have been described in relation with a computer system, the principle of the invention is applicable to other systems using memory blocks for comparison (i.e., tag RAMs), such as translation lookaside buffers (TBLs), routers, and switches.

What is claimed is:

1. A digital data processing system comprising:
   a digital data processor;
   a main memory, responsive to a main memory address from said processor, for storing instructions and data to be processed by said processor, said main memory address including a set field and a tag field;

a cache memory including a data RAM and a tag RAM, said data RAM storing a frequently accessed portion of the instructions and data stored in said main memory, said tag RAM storing tags for accesses to said data RAM and generating cache hit/miss signals by comparing the tag field with the tags stored in said tag RAM; and a controller which stores state information on access type, operation mode and cache hit/miss associated with a first access to said tag RAM, and controls a second access to said tag RAM sequentially following the first access, based on the state information and a portion of a main memory address for the second access, the portion including a least significant bit of the set field.

2. The system according to claim 1, wherein said controller determines whether the second access is applied to the same cache line that was accessed in the first access based on the state information and the portion of the main memory address for the second access.

3. The system according to claim 2, wherein said controller allows the second access to said tag RAM to be skipped when the second access is applied to the same cache line that was accessed in the first access.

4. A cache integrated circuit memory device coupled between a processor and a main memory in a digital data processing system, comprising:

a data RAM circuit, responsive to a portion of a main memory address from said processor, for temporally storing instructions and data processed by said processor;

a tag RAM circuit for storing tags for accesses to said data RAM circuit and for generating a plurality of tag hit signals by comparing a tag field of the main memory address with the stored tags;

a skip flag generator for generating a skip flag signal in response to an access type signal and a set field address signal of the main memory address from said processor;

a first RAM access control logic for controlling accesses to said tag RAM circuit in response to the skip flag signal;

a hit discriminator for generating a plurality of data hit signals in response to an operation mode signal from said processor, the skip flag signal and the tag hit signals; and a second RAM access control logic for controlling accesses to said data RAM circuit in response to the data hit signals.

5. The memory device according to claim 4, wherein said skip flag generator includes means for determining whether a current access to said tag RAM circuit is applied to the same cache line that was accessed in a preceding access to said tag RAM circuit by inspecting the access type signal and the set field address signal from said processor, and for activating the skip flag signal in the current access applied to the same cache line that was accessed in the preceding access.

6. The memory device according to claim 5, wherein said first RAM access control logic, when the skip flag signal is active, cuts off supply of a clock signal to said tag RAM circuit so as to allow the current access to said tag RAM circuit to be skipped.

7. The memory device according to claim 5, wherein said second RAM access control logic transfers a clock signal to said data RAM circuit in response to the data hit signals while the skip flag signal is active so as to allow said data RAM circuit to be accessed.

8. In a digital data processing system including a digital data processor, a main memory, and a cache memory including a tag RAM circuit, a method for operating the cache memory, comprising:

determining whether a current access to said tag RAM circuit is applied to the same cache line that was accessed in a preceding access according to a portion of the access address including a least significant bit of a set field; and allowing the current access to said tag RAM to be skipped when the current access is applied to the same cache line that was accessed in the preceding access.

9. The method according to claim 8, wherein said determining includes:

generating a sequential access signal and a first main memory address as the access address for a current access to said cache memory, said sequential access signal indicative of a sequential access from a preceding access to the current access;

detecting activation of the sequential access signal and determining whether the bit in the current access address is identical with that in the preceding access; and activating a skip flag signal when the sequential access signal is activated and the bit in the current access address is identical with that in the preceding access.

10. The method according to claim 9, wherein said allowing includes:

producing a clock signal; and inactivating the clock signal to said tag RAM circuit when the skip flag signal is activated.

11. The method according to claim 9, wherein the bit comprises a least significant bit of a set field of the access address.

* * * * *